(12) United States Patent
Sujan

(10) Patent No.: US 9,989,147 B2
(45) Date of Patent: Jun. 5, 2018

(54) SYSTEM AND METHODS OF ADJUSTING A TRANSMISSION SHIFT SCHEDULE

(71) Applicant: Cummins, Inc., Columbus, IN (US)

(72) Inventor: Vivek A. Sujan, Columbus, IN (US)

(73) Assignee: Cummins, Inc., Columbus, IN (US)

(*) Notice: Subject to any disclaimer, the term of this patent is extended or adjusted under 35 U.S.C. 154(b) by 360 days.

(21) Appl. No.: 14/725,786

(22) Filed: May 29, 2015

(65) Prior Publication Data

US 2015/0345622 A1    Dec. 3, 2015

Related U.S. Application Data

(60) Provisional application No. 62/005,031, filed on May 30, 2014.

(51) Int. Cl.
*F16H 61/02* (2006.01)
*F16H 59/74* (2006.01)
*F16H 59/66* (2006.01)
*F16H 59/50* (2006.01)

(52) U.S. Cl.
CPC ......... *F16H 61/0213* (2013.01); *F16H 59/50* (2013.01); *F16H 59/66* (2013.01); *F16H 59/74* (2013.01); *F16H 2059/663* (2013.01); *F16H 2059/666* (2013.01); *F16H 2059/743* (2013.01); *F16H 2061/0234* (2013.01)

(58) Field of Classification Search
None
See application file for complete search history.

(56) References Cited

U.S. PATENT DOCUMENTS

| | | | |
|---|---|---|---|
| 4,905,544 A | 3/1990 | Ganoung | |
| 5,070,832 A | 12/1991 | Hapka et al. | |
| 5,484,350 A * | 1/1996 | Ishikawa | F16H 61/0213 477/120 |
| 5,832,400 A | 11/1998 | Takahashi et al. | |
| 6,246,941 B1 | 6/2001 | Sayman | |
| 6,311,118 B1 * | 10/2001 | Ito | B60K 31/047 477/42 |
| 6,389,346 B1 * | 5/2002 | Gianoglio | B60W 10/06 477/78 |
| 6,561,145 B1 | 5/2003 | Stockhausen et al. | |
| 7,650,224 B2 | 1/2010 | Andrea et al. | |
| 7,987,034 B2 * | 7/2011 | Taffin | F16H 61/0213 701/51 |
| 8,099,220 B2 | 1/2012 | Kim et al. | |
| 8,145,376 B2 | 3/2012 | Sherony | |
| 8,187,149 B2 | 5/2012 | Koenig | |
| 8,255,152 B2 | 8/2012 | Barth et al. | |
| 8,332,108 B2 | 12/2012 | Kresse et al. | |
| 8,442,732 B1 | 5/2013 | Steeby | |

(Continued)

*Primary Examiner* — Justin Holmes
(74) *Attorney, Agent, or Firm* — Foley & Lardner LLP

(57) ABSTRACT

A method for a vehicle includes receiving a shift schedule for a transmission of a vehicle, the shift schedule indicating when shift events occur based on operation of the vehicle. The method further includes receiving vehicle operation data during operation of the vehicle. The method further includes determining a power to overcome vehicle losses based on the vehicle operation data. The method further includes determining an adjustment to the shift schedule to optimize a vehicle operating parameter based on the determined power to overcome vehicle losses and implementing the adjustment to the shift schedule.

20 Claims, 10 Drawing Sheets

(56) References Cited

U.S. PATENT DOCUMENTS

| | | | |
|---|---|---|---|
| 8,452,509 B2 | 5/2013 | Sujan et al. | |
| 8,504,258 B2 | 8/2013 | Tiberg | |
| 8,543,302 B2 | 9/2013 | Yoshikawa et al. | |
| 8,585,550 B2 | 11/2013 | Watanabe et al. | |
| 8,676,455 B2 | 3/2014 | Busdiecker et al. | |
| 2011/0106388 A1 | 5/2011 | Boeckenhoff et al. | |
| 2012/0116647 A1 | 5/2012 | Pochner et al. | |
| 2012/0197500 A1 | 8/2012 | Sujan et al. | |
| 2012/0221217 A1 | 8/2012 | Sujan et al. | |
| 2013/0038438 A1 | 2/2013 | Olsen et al. | |
| 2013/0151090 A1* | 6/2013 | Chae | B60T 7/12 701/54 |
| 2013/0173124 A1 | 7/2013 | Palmer | |
| 2013/0184949 A1 | 7/2013 | Saito et al. | |
| 2013/0297161 A1* | 11/2013 | Gibson | B60W 20/00 701/54 |
| 2014/0019022 A1 | 1/2014 | Kresse et al. | |
| 2014/0142822 A1* | 5/2014 | Li | F16H 61/00 701/55 |
| 2014/0172252 A1* | 6/2014 | Siegel | F16H 61/00 701/55 |
| 2014/0172253 A1* | 6/2014 | Palmer | B60W 10/11 701/56 |
| 2015/0198240 A1* | 7/2015 | Ajimoto | F16H 61/21 701/55 |
| 2015/0329119 A1 | 11/2015 | Sujan et al. | |
| 2015/0345622 A1 | 12/2015 | Sujan | |

\* cited by examiner

SYSTEM AND METHODS OF ADJUSTING A TRANSMISSION SHIFT SCHEDULE

CROSS-REFERENCE TO RELATED APPLICATIONS

This application claims the benefit of U.S. Provisional Patent Application No. 62/005,031, filed May 30, 2014, which is incorporated herein by reference in its entirety.

TECHNICAL FIELD

The present disclosure relates to a powertrain system for a vehicle. More particularly, the present disclosure relates to dynamically controlled transmission systems for a vehicle.

BACKGROUND

In a vehicle, the powertrain or powertrain system refers to the components that provide the power to move the vehicle. These components include the engine, transmission, drive/propeller shaft, differentials, and final drive. For an internal combustion engine, the engine combusts a fuel to generate mechanical power. This power rotates a crankshaft of the engine. The transmission receives the rotating crankshaft and manipulates the engine speed (i.e., the rotation of the crankshaft) to output a rotation speed of the drive/propeller shaft. The rotating drive shaft is received by a differential, which transmits the rotational power to a final drive to cause a movement of the vehicle. In an automobile, the differential enables the wheels, on a shared axle, to rotate at different speeds (e.g., during a turn, the outer wheel spins faster relative to the inner wheel to allow the vehicle to maintain its speed and line of travel). The final drive refers to the wheels, propeller, or other movement-producing device of the vehicle.

Because engine speed does not always equate to a desired final drive speed (and, consequently, vehicle speed), the transmission manipulates the engine speed to affect the drive shaft speed and, therefore, the desired vehicle speed. To achieve a different drive shaft speed relative to the engine speed, some transmission systems utilize a plurality of gears that either increase or decrease the drive shaft rotational speed relative to the engine speed using gear ratios (e.g., 2:1, which indicates that the engine is rotating twice as fast as the output speed). Gear selection can be done by an operator of the vehicle or automatically without operator input and can be based on engine speed, vehicle speed, throttle position, and load on the engine. For example, during highway driving, the transmission may use a higher gear that provides a relatively higher transmission output speed (i.e., speed of the propeller/driver shaft) than a lower gear to maintain/achieve the relatively greater vehicle speed needed for highway driving. As such, the transmission allows the vehicle to achieve desired vehicle speeds and powers largely independent of the engine.

SUMMARY

One embodiment of the present disclosure relates to a method. The method includes receiving a shift schedule for a transmission of a vehicle, the shift schedule indicating when shift events occur based on operation of the vehicle. The method further includes receiving vehicle operation data during operation of the vehicle. The method further includes determining a power to overcome vehicle losses based on the vehicle operation data. The method further includes determining a power to support vehicle acceleration based on the vehicle operation data. The method further includes determining an adjustment to the shift schedule to optimize a vehicle operating parameter based on the determined power to overcome vehicle losses and the determined power to support vehicle acceleration. The method further includes providing a command to implement the adjustment to the shift schedule.

In some embodiments, the adjustment to the shift schedule includes at least one of a delay to a scheduled shift event, an early implementation of a scheduled shift event, and a skipping of a scheduled shift event. In other embodiments, the adjustment to the shift schedule includes an adjustment to a shift point for one or more transmission settings.

In some embodiments, the vehicle operating parameter includes a fluid consumption rate, an exhaust emissions characteristic, a noise level of the vehicle, an acceleration characteristic, a number of transmission setting shifts, and a gradability characteristic.

In some embodiments, the power to overcome vehicle losses includes a wheel drag power, an aerodynamic power, a gravitational power, a final drive power, a transmission power, and an engine power.

In some embodiments, the power to support vehicle acceleration includes a vehicle acceleration power, a wheel acceleration power, a final drive acceleration power, a transmission acceleration power, and an engine acceleration power.

In some embodiments, the command is provided to the transmission. In other embodiments, the command is provided to a user input/output device for an operator to implement the adjustment with the transmission.

Another embodiment of the present disclosure relates to a system for a vehicle. The system includes a power train system including an engine, a transmission, a drive shaft, and a final drive. The system further includes a controller communicably coupled to the power train system. The controller is structured to receive a shift schedule for a transmission of a vehicle, the shift schedule indicating when shift events occur based on operation of the vehicle. The controller is further structured to receive vehicle operation data during operation of the vehicle, determine a power to overcome vehicle losses based on the vehicle operation data, and determine a power to support vehicle acceleration based on the vehicle operation data. The controller is further structured to determine an adjustment to the shift schedule to optimize a vehicle operating parameter based on the determined power to overcome vehicle losses and the determined power to support vehicle acceleration, and to provide a command to implement the adjustment to the shift schedule.

Yet another embodiment of the present disclosure relates to a system for a vehicle. The system includes a power train system including an engine, a transmission, a drive shaft, and a final drive. The system further includes a controller communicably coupled to the power train system. The controller is structured to receive a shift schedule for the transmission of a vehicle, the shift schedule indicating when shift events occur based on operation of the vehicle. The controller is further structured to receive a route of the vehicle, receive route data for the route of the vehicle in advance of the vehicle traveling the route, receive vehicle operation data during operation of the vehicle, determine a power to overcome vehicle losses based on the vehicle operation data, and determine a power to support vehicle acceleration based on the vehicle operation data. The controller is further structured to determine an adjustment to the shift schedule to optimize a vehicle operating parameter based on the determined power to overcome vehicle losses, the determined power to support vehicle acceleration and the route data, and to provide a command to implement the adjustment to the shift schedule.

Still another embodiment relates to a method. The method includes receiving a shift schedule for a transmission of a vehicle, the shift schedule indicating when shift events occur based on operation of the vehicle; receiving vehicle operation data regarding operation of the vehicle; determining a power to overcome vehicle losses based on the vehicle operation data; determining an adjustment to the shift schedule responsive to the determined power to overcome losses and a vehicle operating parameter; and implementing the adjustment with the shift schedule of the transmission.

Yet another embodiment relates to a system. The system includes a powertrain system including an engine and a transmission, and a controller communicably coupled to the power train system. The controller is structured to receive a shift schedule for the transmission of a vehicle, the shift schedule indicating when shift events occur based on operation of the vehicle; receive vehicle operation data regarding operation of the vehicle; determine a power to overcome vehicle losses based on the vehicle operation data; determine an adjustment to the shift schedule responsive to the determined power to overcome losses and a vehicle operating parameter; and implement the adjustment with the shift schedule.

A further embodiment relates to an apparatus. The apparatus includes a vehicle operation module structured to receive operation data regarding operation of a vehicle; a power module structured to determine a power to overcome vehicle losses in response to the vehicle operation data and based on an expression for vehicle losses using vehicle speed; and a transmission module structured adjust a shift schedule of a transmission of the vehicle responsive to the determined power to overcome vehicle losses and a vehicle operating parameter.

These and other features, together with the organization and manner of operation thereof, will become apparent from the following detailed description when taken in conjunction with the accompanying drawings.

DETAILED DESCRIPTION

Figure 1:
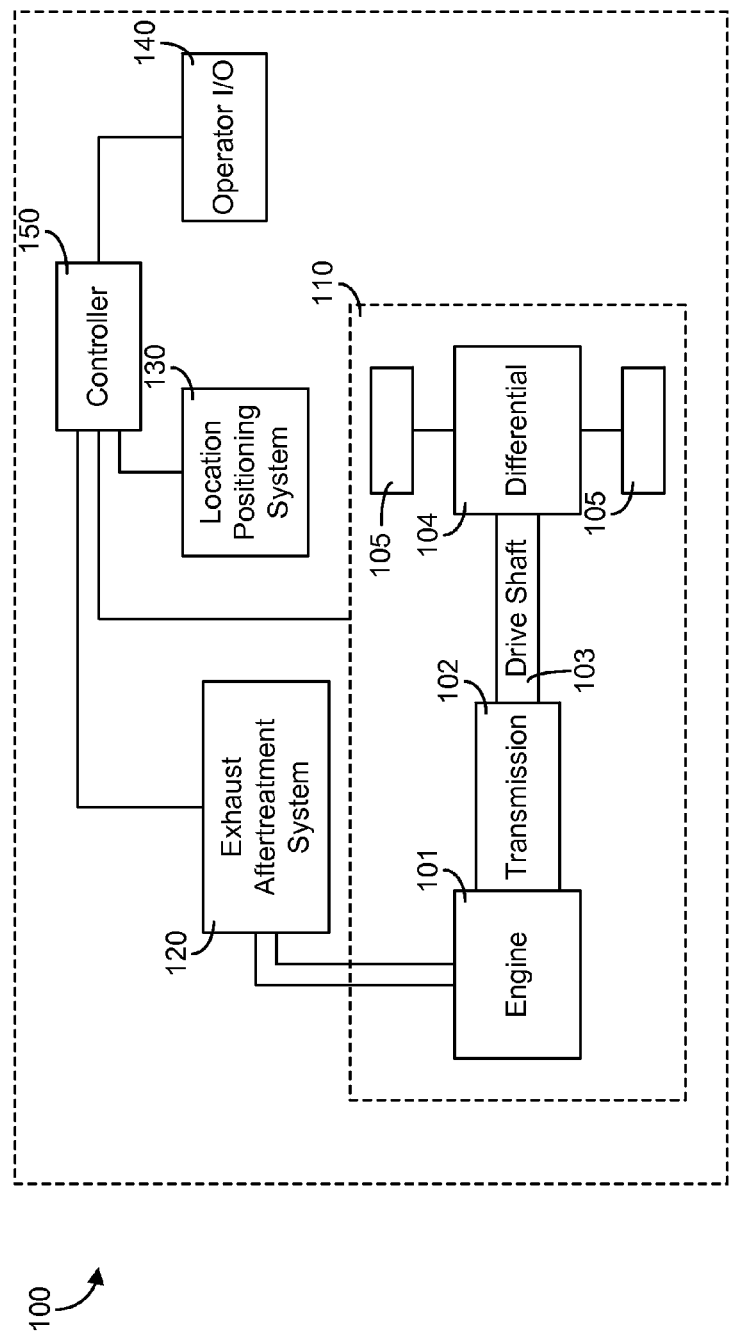
FIG. 1 is a schematic diagram of a powertrain system coupled to a controller in a vehicle, according to an example embodiment.

Referring to the Figures generally, the various embodiments disclosed herein relate to systems and methods for controlling an engine and a transmission for a vehicle. According to the present disclosure, a controller is operatively coupled to an internal combustion engine and a transmission in a vehicle. Due to this integration, the controller receives data from both the engine and transmission in addition to the vehicle itself in real time or substantial real time. The controller utilizes this data to dynamically adjust the shift schedule (i.e., one or more shift events) of the transmission in order to optimize or substantially optimize a selected vehicle operating parameter, such as fuel economy.

In one embodiment, the controller uses information relating to engine power used to overcome vehicle losses such as aerodynamic and rolling resistance, powertrain losses, etc. The controller further uses information relating to the engine power used to support vehicle acceleration and overcome road grade. Based on this information, the controller can dynamically adjust the shift schedule of the transmission.

In conventional applications, the shift schedule of the transmission is a function of the measure of the total engine load and the engine speed. The measure may be based on the engine load/speed itself or an equivalent parameter (e.g., load/speed of another element in the powertrain). As such, all vehicles with the same driveline experience the same shift schedule. However, since vehicle properties for two different vehicles are usually different (e.g. a car and a truck towing a trailer), the same driveline and shift schedule for both vehicles will result in different (and potentially significant) vehicle behaviors. Two vehicles with significantly different aerodynamic drag loss (with other factors being equal) will have a different engine load profile for the same maneuver (e.g., accelerate from 0-60 miles-per-hour ("MPH")). This may result in shift event changes that are perceivable to the operator (i.e., drivability and fuel economy).

According to the present disclosure, the shift schedule may be adjusted and at least partially based on a vehicle loss load (e.g., aerodynamic and rolling resistance losses, powertrain losses, etc.) in addition to the total engine load and engine speed. By considering the vehicle loss load, the controller may adjust the shift schedule to support road grade and vehicle acceleration requirements without needing to change operator behavior between vehicles (i.e., the transmission will operate similarly no matter the vehicle, such that an operator does not need to change his/her driving style). For example, an operator may prefer driving their semi-truck in fourth gear because it gives them the needed vehicle speed and leaves room for acceleration, if needed (i.e., in higher gears, acceleration ability decreases). If that operator switches to a car with the same transmission, the car will experience relatively lower amounts of aerodynamic losses, which impacts the total load on the vehicle. Accordingly, although the transmission shift schedule is the same, the operator likely uses a different gear in the car than in the semi-truck. In the present disclosure, the controller adjusts the shift schedule in the car to achieve the same acceleration characteristics as the operator preferred in the semi-truck. In another example, the controller adjusts the shift schedule to achieve or substantially achieve a desired characteristic of a different operating parameter (e.g., fuel economy). In any event, the controller utilizes the power information to adjust the shift schedule and optimize or substantially optimize one or more vehicle operating parameters.

Referring now to FIG. 1, a schematic diagram of a dynamically controlled transmission for a vehicle is shown. The vehicle 100 may be an on-road or off-road vehicle including, but not limited to, line-haul trucks, mid-range trucks (e.g., pick-up trucks), tanks, airplanes, and any other type of vehicle that utilizes a transmission. Although FIG. 1 depicts the vehicle 100 as including an internal combustion engine 101, the vehicle 100 may be powered by any type of engine system. For example, the vehicle 100 may be a hybrid vehicle, a full electric vehicle, and/or an internal combustion engine powered vehicle as shown. In FIG. 1, the vehicle 100 is shown to include a powertrain system 110, an exhaust aftertreatment system 120, a location positioning system 130, an operator input/output (I/O) device 140, and a controller 150. In this example, the vehicle 100 is structured as a diesel-fuel powered vehicle. Accordingly, the exhaust aftertreatment system 120 reduces nitrous oxides (NOx) and particulate matter emissions from the engine 101. The components of FIG. 1 may be more fully explained as follows.

The powertrain system 110 facilitates power transfer from the engine 101 to power the vehicle 100. As shown, the powertrain system 110 includes an engine 101, a transmission 102, a drive shaft 103, a differential 104, and a final drive 105. As a brief overview, the engine 101 receives a chemical energy input (e.g., a fuel such as gasoline or diesel) and combusts the fuel to generate mechanical energy, in the form of a rotating crankshaft. The transmission 102 receives the rotating crankshaft and manipulates the speed of the crankshaft (i.e., the engine RPM) to effect a desired drive shaft 103 speed. The rotating drive shaft 103 is received by a differential 104, which provides the rotational energy of the drive shaft 103 to the final drive 105. The final drive 105 then propels or moves the vehicle 100.

The engine 101 may be structured as any internal combustion engine (e.g., compression-ignition or spark-ignition), such that it can be powered by any fuel type (e.g., diesel, ethanol, gasoline, etc.). Similarly, as mentioned above, the transmission 102 may be structured as any type of transmission, such as a continuous variable transmission, a manual transmission, an automatic transmission, an automatic-manual transmission, a dual clutch transmission, etc. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, or a slip-in-tube driveshaft based on the application.

In another embodiment, the engine 101 may be structured as a battery-powered motor. Thus, the battery-powered motor may be used in a full electric vehicle. In some embodiments, the engine 101 may include both an internal combustion engine and a battery-powered motor. These configurations may be used with hybrid powered vehicles.

The exhaust aftertreatment system 120 is in fluid communication with the engine 101, such that the aftertreatment system 120 receives the exhaust from the combustion process in the engine 101. As the example in FIG. 1 is a diesel-powered vehicle 100, the exhaust aftertreatment system 120 includes any component used to reduce diesel exhaust emissions. As such, the system 120 can include a selective catalytic reduction catalyst, a diesel oxidation catalyst, a diesel particulate filter, a diesel exhaust fluid doser with a supply of diesel exhaust fluid, and a plurality of sensors for monitoring the system 120 (e.g., a NOx sensor).

Figure 2:
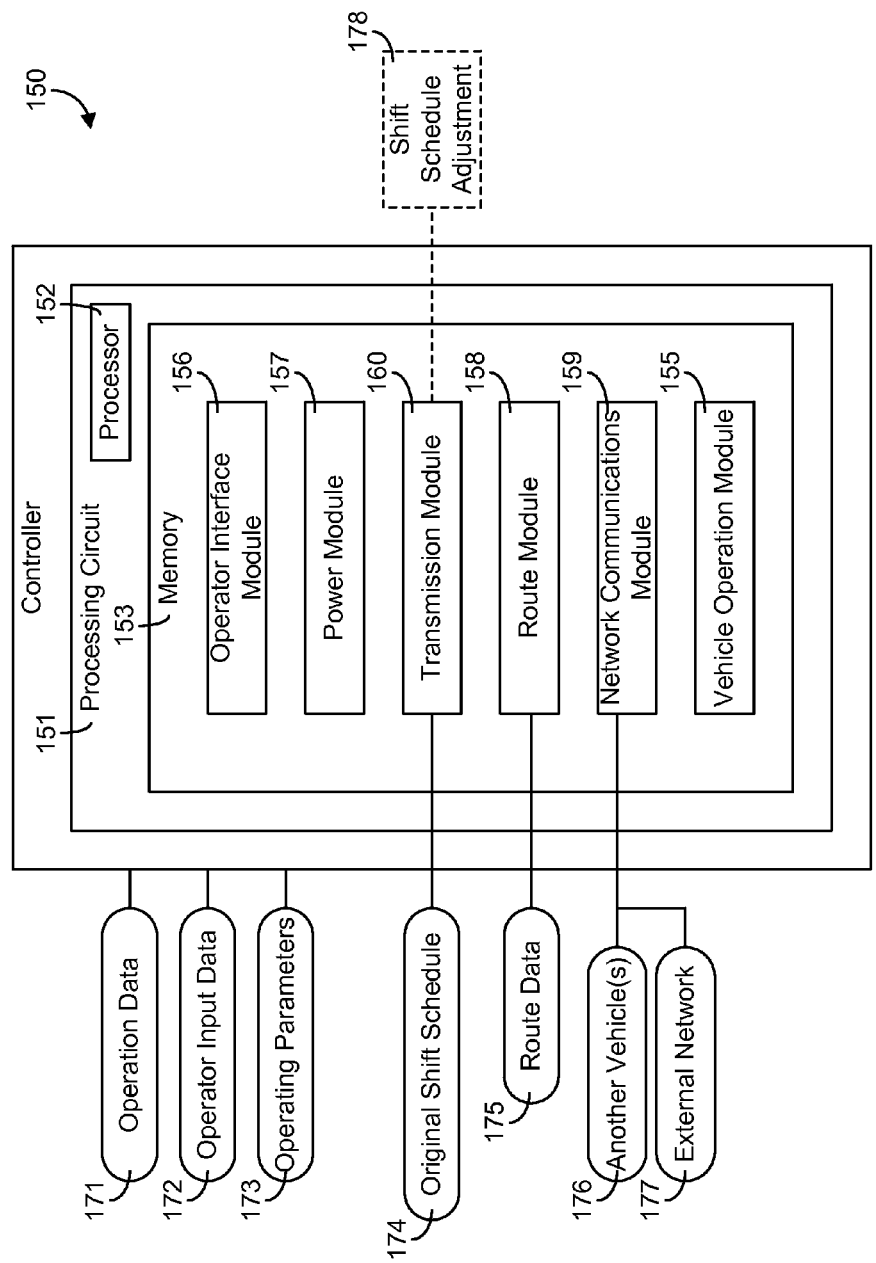
FIG. 2 is a schematic diagram of the controller of FIG. 1, according to an example embodiment.

As explained more fully in regard to FIG. 2, the location positioning system 130 is structured to acquire route data (e.g., route data 175) for a route of the vehicle 100. The location positioning system 130 can therefore be structured as any location system, such as a global positioning system that is communicably coupled to one or more satellites, and the like. In operation, the operator input/output device 140 enables an operator to specify a route of the vehicle. In some embodiments, the controller 150 divides the route into one or more route segments. The division may be based on a distance (e.g., one-hundred feet, one length of a line-haul truck, etc.), terrain (e.g., an uphill portion, a downhill portion, and a flat portion), or any another route dividing characteristic. As such, the route data may correspond with each particular route segment. For example, road curvature and altitude levels may be specific to each route segment. Further, after specification of the route, the controller 150 can receive the route data in advance of the vehicle 100 traveling the route (prior to each route segment traversal). As explained in regard to method 1000, the controller 150 utilizes the route data and in some embodiments, in connection with the vehicle operating data, to adjust the shift schedule for the transmission.

The operator input/output device 140 enables an operator of the vehicle to communicate with the vehicle 100 and the controller 150. For example, the operator input/output device 140 may include, but is not limited, an interactive display (e.g., a touchscreen, dashboard buttons/input devices, etc.), an accelerator pedal, a clutch pedal, a shifter for the transmission, a cruise control input setting, etc. Via the input/output device 140, the operator can designate preferred characteristics of one or more vehicle parameters. For example, when the transmission 102 is structured as an automatic transmission, the operator may input a desire to optimize fuel economy or minimize engine noise via the input/output device 140. The controller 150 dynamically and automatically (e.g., without operator input other than their inputted preference) adjusts the shift schedule of the transmission 102 in accord with the operator's input based on the determined vehicle losses and power to support vehicle acceleration. In another example, when the transmission 102 is structured as a manual transmission, the operator input/output device 140 provides an instruction or prompt of when and to what gear/transmission setting the operator should shift to in accord with the operator's inputted desired operating characteristics and the vehicle losses and power to support acceleration. In this embodiment, the operator is controlling the shift events to possibly alter/adjust the shift schedule of the transmission 102.

As shown, the controller 150 is communicably coupled to the powertrain system 110, the exhaust aftertreatment system 120, the location positioning system 130, and the operator input/output device 140. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data from one or more of the components shown in FIG. 1. The vehicle operating data may be received via one or more sensors (e.g., a speed sensor attached to the engine) attached to the components in FIG. 1. As described more fully herein, due to the integration of the controller 150 with the components of FIG. 1, the controller 150 can acquire this data to dynamically adjust the transmission 102 shift schedule to substantially achieve various operating characteristics of one or more vehicle operating parameters.

As the components of FIG. 1 are shown to be embodied in a vehicle 100, the controller 150 may be structured as an electronic control module ("ECM"). The ECM may include a transmission control unit and any other control unit included in a vehicle (e.g., exhaust aftertreatment control unit, engine control unit, powertrain control module, etc.).

Referring now to FIG. 2, the function and structure of the controller 150 are shown according to one example embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the controller 150 and provide computer code or instructions to the controller 150 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes a vehicle operation module 155, an operator interface module 156, a power module 157, a route module 158, a network communications module 159, and a transmission module 160. The modules are configured to selectively adjust a transmission shift schedule for the vehicle 100 responsive to a determined power loss and acceleration power for the vehicle 100 to achieve or substantially achieve one or more desired operating parameters for the vehicle 100 (e.g., fuel economy, power performance, emissions, etc.). While various modules with particular functionality are shown in FIG. 2, it should be understood that the controller 150 and memory 154 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In one embodiment, the operator interface module 156 may be communicably coupled to the operator I/O device 140 to receive inputs from (e.g., voice commands, touch commands, etc.) and provide information to operator, passenger, or other user of the vehicle 100. In another embodiment, the operator interface module 156 may include the operator I/O device 140. While the module 156 is named using the term "operator" (similar to "operator" I/O device 140), this notation is not meant to be limiting as these components may be utilized by users other than the vehicle operator. In operation, the operator interface module 156 is structured to receive operator input data 172.

One or more operating parameters 173 may also be received via the operator interface module 156. In operation, the transmission module 160 may selectively adjust a shift schedule for the transmission pursuant to a desired characteristic of one or more operating parameters 173. The vehicle operating parameters 173 may include, but are not limited to, a fluid consumption rate (e.g., fuel, coolant, oil, etc.), an exhaust emissions characteristic, a noise level of the vehicle, an acceleration characteristic, a number of transmission setting shifts, and a gradability characteristic. Accordingly, a desired operating characteristic of the vehicle operating parameters 173 may include a minimization of fuel consumption, a reduction of engine noise, a minimization of NOx emissions, and the like. Minimization, reduction, maximization, increase, and other quantifiable terms may be based on a threshold value, a threshold value at various operating conditions (e.g., heavy load, light load, idle, etc.), some predefined minimum/maximum range or values for each parameter, etc. In this regard, these terms are meant to be broadly defined and interpreted.

The vehicle operation module 155 is structured to receive operation data 171. The operation data 171 provides an indication of operating conditions experienced by the vehicle 100. The operation data 171, also referred to as vehicle operation data, may include but is not limited to, the vehicle speed, the current transmission gear/setting, the load on the vehicle/engine, the throttle position, a set cruise control speed, data relating to the exhaust aftertreatment system 120, output power, engine speed, fluid consumption rate (e.g., fuel consumption rate, diesel exhaust fluid consumption rate, etc.), any received engine/vehicle faults (e.g., a fault code indicating a low amount of diesel exhaust fluid), engine operating characteristics (e.g., whether all the cylinders are activated or which cylinders are deactivated, etc.), etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst). In this regard and in certain embodiments, the vehicle operation module 155 may include one or more sensors operable to acquire the aforementioned data, such as temperature sensors, flow sensors, pressure sensors, speed sensors, fluid level sensors, oxygen sensors, mass air flow sensors, and the like.

Figure 3:
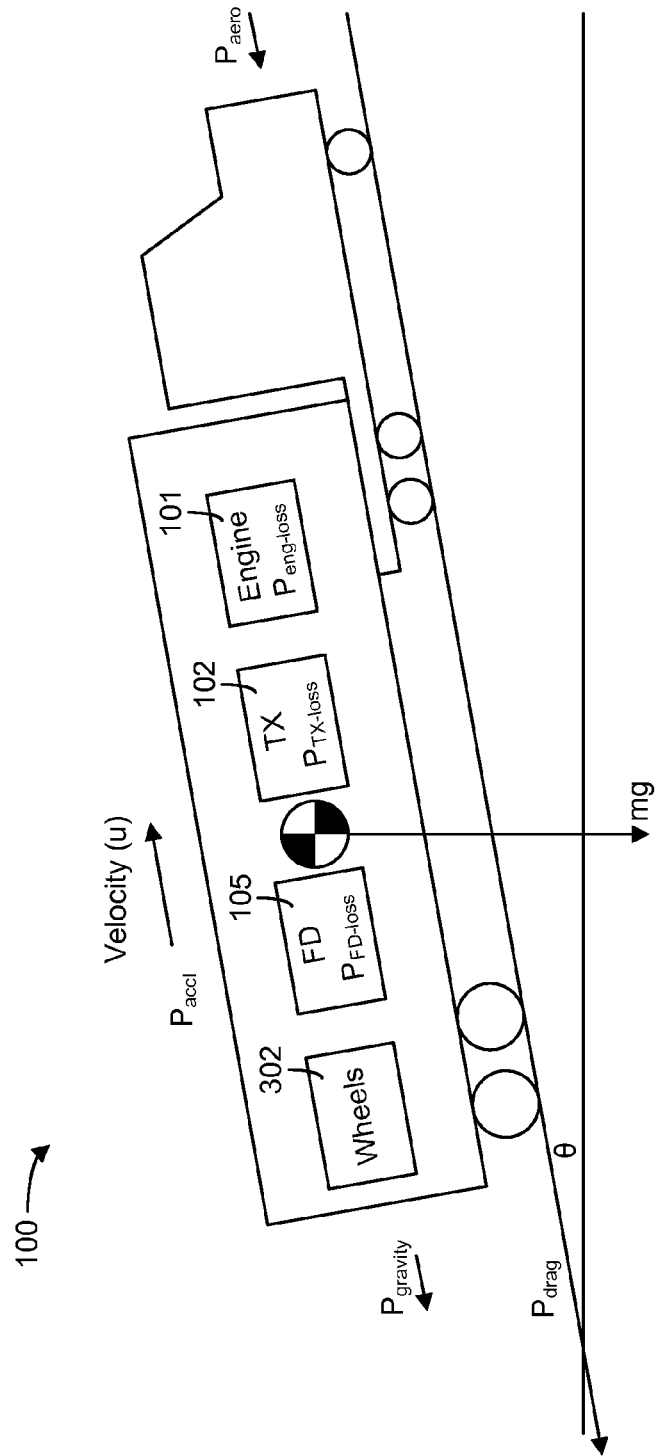
FIG. 3 is a schematic diagram of a vehicle showing the power required to overcome various forces related to operation of the vehicle, according to an example embodiment.

The power module 157 is structured to determine the power to overcome vehicle losses and support vehicle acceleration. The determined power may include one or more of a vehicle acceleration power, a wheel acceleration power, a final drive acceleration power, a transmission acceleration power, and an engine acceleration power. Referring now to FIG. 3, a schematic diagram of the vehicle 100 is shown that indicates the power required to overcome various forces associated with the vehicle according to one embodiment. Powers associated with the vehicle 100 may generally include the engine power required to overcome aerodynamic or wind resistance ($P_{aero}$) the power required to accelerate the vehicle ($P_{accl}$) the power required to overcome the drag of the wheels 302 ($P_{drag}$), and the power required to overcome the force of gravity ($P_{gravity}$). Additionally, the engine 101 needs to overcome the equivalent to the efficiency of the engine ($P_{eng-loss}$), the efficiency of the transmission 102 ($P_{TX-loss}$), and the efficiency of the final drive 105 ($P_{FD-loss}$).

The power consumed for propelling a vehicle $P_{propulsion}$, which is equivalent to the power from the engine 101, $P_{eng-out}$, may be determined from Equation (1).

$$P_{propulsion} = P_{eng-out} = P_{aero} + P_{drag} + P_{gravity} + P_{accl} + P_{loss} \quad \text{Equation (1)}$$

$$P_{eng-out} - P_{gravity} - P_{accl} = P_{aero} + P_{drag} + P_{loss} \quad \text{Equation (2)}$$

Equation (2) represents Equation (1) re-arranged. With the formulations shown below, the power module 157 can readily determine the engine load $P_{eng-out}$, road grade load $P_{gravity}$, and acceleration load $P_{accl}$ based on vehicle operation data 171 regarding the vehicle mass and current road grade. With this knowledge, the left hand side of Equation (2) becomes known for a plurality of vehicle speeds and road grades. In turn, the right hand side—the vehicle loss load—also becomes known for a plurality of vehicle speeds and road grades. As shown below, the formulations that represent each term on the right hand side of Equation (2) are based, at least in part, on terms that may be difficult to determine during vehicle operation. Accordingly, Applicant has determined that the total of the three terms on the right hand side of Equation (2) can be represented by a mathematical expression, namely a quadratic equation (i.e., $Av^2 + Bv + C$), that is a function of vehicle speed (i.e., "v"). At zero vehicle speed, the term "C" is zero. Therefore, the quadratic simplifies to $Av^2 + Bv$ as representative of the right hand side of Equation (2). To determine the coefficients, "A" and "B," the power module 157 may use at least one of a time-based, convergence percentage (e.g., fit percentage), and/or distance-based convergence methodology. That is to say, when the vehicle driving initiates, the coefficients "A" and "B" are unknown. Over time (or distance), the power module 157 continuously determines the left hand side of Equation (2) as a function of vehicle speed. After a predefined number of data points have been acquired (e.g., based on a predefined time of operation, distance of operation, etc.), the quadratic can be fit to the data points to determine the coefficients "A" and "B." Further, during extended operation of the vehicle, the coefficients may be continually refined until the fit percentage (e.g., how well the quadratic curve fits the data) is at or above a predefined minimum. Once a sufficient amount of convergence is achieved, the power module 157 can determine a value representative of the total of the three terms on the right hand side of Equation (2) (i.e., using $Av^2 + Bv$). Then, at a particular road grade, the only unknown variable is $P_{eng-out}$, which the power module 157 can readily solve Equation (2) for. Accordingly, the determined engine power output considers the total vehicle losses which, as described herein, can be used by the transmission module 160 to determine a shift schedule adjustment.

Advantageously, by using the low-order polynomial to represent total vehicle losses, the controller 150 of the present disclosure can save bandwidth and memory space, reduce the need to solve complicated equations, and more quickly and efficiently determine the power output required form the engine. It should be understood that other low-order polynomials may be used to establish a vehicle loss formulation based on vehicle speed, such that the quadratic used above is not meant to be limiting. Further, the formulas shown above may be embodied in the power module 157 as one or more look-up tables, models, and the like to facilitate relatively quick determinations.

For completeness, Equations (3)-(17) show the breakdown or determination process for the terms shown in Equations (1)-(2). As mentioned above and what can be appreciated below, the terms on the left hand side of Equation (2) represent values that can be observed, monitored, or readily determined from a combination of known variables (e.g., gravity) to observed variables (e.g., road grade). However, as shown below, the terms on the right hand side of Equation (2) include variables that may be complicated and/or not readily determined (e.g., static and dynamic rolling resistances that change based on the terrain). Therefore, the power module 157 may represent the vehicle losses, terms on the right hand side of Equation (2), with a formula for best fit (e.g., a low order polynomial) as described above. Turning to Equations (3)-(17) in more details, the power to overcome the aerodynamic drag or wind resistance of the vehicle 100 ($P_{aero}$), may be calculated from Equation (3).

$$P_{aero} = \left( \frac{A \cdot C_D \cdot \rho \cdot u^2}{2} \right) \cdot u \quad \text{Equation (3)}$$

In Equation (3), $A \cdot C_D$ is the vehicle aerodynamic drag area (A) times the aerodynamic drag coefficient ($C_D$), which is a measure of aerodynamic resistance of a cross-sectional area. The term $\rho$ is the air density, and the term u is the velocity or speed of the vehicle 100.

The power to overcome wheel drag ($P_{drag}$) may be calculated using Equation (4).

$$P_{drag} = [(C_{rr-dyn})(m \cdot g \cdot \cos \theta)(u) + (C_{rr-static})(m \cdot g \cdot \cos \theta)](u) \quad \text{Equation (4)}$$

The term $C_{rr-dyn}$ is the wheel dynamic rolling resistance and the term $C_{rr-static}$ is the wheel static rolling resistance. The term m is the mass of the vehicle 100, the term g is the acceleration due to gravity, and the term $\theta$ is a road slope. Equation (4) may be simplified to the form of Equation (5).

$$P_{drag} = [(C_{rr-dyn})(u) + (C_{rr-static})](m \cdot g \cdot \cos \theta)(u) \quad \text{Equation (5)}$$

The power required to overcome the force due to gravity ($P_{gravity}$) may be found from Equation (6), which uses previously defined terms.

$$P_{gravity} = (m \cdot g \cdot \sin \theta)(u) \quad \text{Equation (6)}$$

The power required to accelerate the vehicle 100 includes multiple components, including the power required to accelerate the vehicle alone ($P_{veh-accl}$), the power to accelerate the wheels 302 ($P_{whl-accl}$), the power required to accelerate the final drive 105 ($P_{FD-accl}$), the power required to accelerate the transmission 102 ($P_{TX-accl}$), and the power to accelerate the engine 101 ($P_{eng-accl}$). The calculation is shown in Equation (7).

$$P_{accl} = P_{veh-accl} + P_{whl-accl} + P_{FD-accl} + P_{TX-accl} + P_{eng-accl} \quad \text{Equation (7)}$$

Each of these terms may be individually calculated. The power required to accelerate the vehicle ($P_{veh\text{-}accl}$) may be found from the vehicle mass m, the vehicle acceleration a, and the vehicle velocity u, as shown in Equation (8).

$$P_{veh\text{-}accl} = m \cdot a \cdot u \qquad \text{Equation (8)}$$

The power required to accelerate the wheels 302 ($P_{whl\text{-}accl}$) may be found from $I_{whl}$, which is the inertia of wheels 302, $\dot{\omega}_{whl}$, which is the angular acceleration of the wheels, and $\omega_{whl}$, which is the angular velocity of the wheels, as shown in Equation (9).

$$P_{whl\text{-}accl} = I_{whl} \cdot \dot{\omega}_{whl} \cdot \omega_{whl} \qquad \text{Equation (9)}$$

The power required to accelerate the final drive 105 ($P_{FD\text{-}accl}$) may be found from $I_{FD}$, which is the inertia of the final drive 105, $\dot{\omega}_{FD}$, which is the final drive angular acceleration, and $\omega_{FD}$, which is the final drive angular velocity, as shown in Equation (10).

$$P_{FD\text{-}accl} = I_{FD} \cdot \dot{\omega}_{FD} \cdot \omega_{FD} \qquad \text{Equation (10)}$$

The power required to accelerate the transmission 102 ($P_{TX\text{-}accl}$) may be found from $I_{TX}$, which is the inertia of the transmission 102, $\dot{\omega}_{TX}$, which is the transmission angular acceleration, and $\omega_{TX}$, which is the transmission angular velocity, as shown in Equation (11).

$$P_{TX\text{-}accl} = I_{FD} \cdot \dot{\omega}_{TX} \cdot \omega_{TX} \qquad \text{Equation (11)}$$

The power required to accelerate the engine 101 ($P_{eng\text{-}accl}$) may be found from $I_{Eng}$, which is the inertia of engine 101, $\dot{\omega}_{eng\text{-}out}$, which is the engine angular acceleration, and $\omega_{eng\text{-}out}$, which as mentioned above is the engine angular velocity, as shown in Equation (12).

$$P_{eng\text{-}accl} = I_{TX} \cdot \dot{\omega}_{eng\text{-}out} \cdot f_{eng\text{-}out} \qquad \text{Equation (12)}$$

Each of the angular velocities and angular accelerations may be derived from data provided in the vehicle parameters in conjunction with the vehicle acceleration and velocity.

The final term of Equation (1), $P_{loss}$, is a summary of the losses that need to be overcome in the vehicle 100. These losses may be summarized as in Equation (13).

$$P_{loss} = P_{FD\text{-}loss} + P_{TX\text{-}loss} + P_{eng\text{-}loss} \qquad \text{Equation (13)}$$

The loss from the final drive 105 ($P_{FD\text{-}loss}$) may be calculated from $\Im(\omega_{FD\text{-}in}, \tau_{FD\text{-}in})$, which may be found in a lookup table of the final drive torque loss, and $\omega_{FD\text{-}in}$, which is the angular velocity of the final drive at the input, as shown in Equation (14).

$$P_{FD\text{-}loss} = \Im(\omega_{FD\text{-}in}, \tau_{FD\text{-}in}) \cdot \omega_{FD\text{-}in} \qquad \text{Equation (14)}$$

The loss from the transmission 102 ($P_{TX\text{-}loss}$) may be calculated from $\Im(\omega_{TX\text{-}in}, \tau_{TX\text{-}in})$, which may be found in a lookup table of the transmission torque loss, and $\omega_{TX\text{-}in}$, which is the angular velocity of the transmission at the input, as shown in Equation (15).

$$P_{TX\text{-}loss} = \Im(\omega_{TX\text{-}in}, \tau_{TX\text{-}in}) \cdot \omega_{TX\text{-}in} \qquad \text{Equation (15)}$$

The loss from the engine 101 may be calculated from $\Im(\omega_{eng\text{-}out})$, which is found in a lookup table of the engine torque loss, as shown in Equation (16).

$$P_{eng\text{-}Loss} = (\omega_{eng\text{-}Out}) \cdot \omega_{eng\text{-}Out} \qquad \text{Equation (16)}$$

The power consumed in propelling the vehicle 100 may now be shown in terms of all the powers required, as shown in Equation (17).

$$P_{eng\text{-}out} = P_{aero} + P_{drag} + P_{gravity} + (P_{veh\text{-}accl} + P_{whl\text{-}accl} + P_{FD\text{-}accl} + P_{TX\text{-}accl} + P_{eng\text{-}accl}) + (P_{FD\text{-}loss} + P_{TX\text{-}loss} + P_{eng\text{-}loss}) \qquad \text{Equation (17)}$$

Even though $P_{eng\text{-}loss}$ is shown in Equation (17), it may be accounted for elsewhere. For example it may be integral to $P_{eng\text{-}out}$ and may not need to be explicitly included in Equation (17). Of course, where the variables used on the right hand side of Equation (2) can be readily determined or are known, then the power module 157 may use the aforementioned equations (or similar equations) to determine the total vehicle losses and solve for the engine out power, $P_{eng\text{-}out}$. Accordingly, in certain embodiments, the use of a mathematical expression (the low-order polynomial described above that is a function of vehicle speed) may be avoided.

It should further be understood that the above formulations (i.e., equations (1)-(17)) are exemplary as other formulations may be used and mathematical expressions thereof (like the low-order polynomial shown above) may be substituted without departing from the spirit and scope of the present disclosure.

Therefore, the power module 157 may determine the engine power output, $P_{eng\text{-}out}$, at various vehicle speeds and road grades, which as shown above as a function of the total vehicle losses. While this power determination is largely static in nature (i.e., based on the current operating conditions), the controller 150 may include additional structure to account for dynamic conditions and planning purposes. In this regard, the controller 150 is shown to include a route module 158 and a network communications module 159. The route module 158 is structured to receive route data 175. In certain embodiments, the route module 158 may include the location position system 130 while in other embodiments, the route data 175 is provided by the location position system 130 (or another component) to the module 158. The route data 175 includes, but is not limited to, latitude data, longitude data, altitude data, posted speed limits, grades, signage for the routes, and curvature data for the route. In some embodiments, the route module 158 divides the route into one or more route segments. The route segments correspond with substantially continuous portions of route data 175 (e.g., the altitude for this portion of the route stays substantially the same). Accordingly, the route data 175 may correspond with each one of the segments of the route. Latitude and longitude data provides an indication of the location of the vehicle. Altitude data provides an indication of the level of elevation of the route to, for example, indicate downhill and uphill portions of the route. Curvature data provides an indication of the curves in the route. In one embodiment and as mentioned above, the route data 175 is obtained by the location positioning system 130 and provided to the route module 158.

The network communications module 159 is structured to communicate with at least one of another vehicle 176 (e.g., via short-range to medium-range wireless communication, etc.) and an external network 177 (e.g., a central server, database, a fleet manager, a traffic center, global positioning systems, etc.) to establish an intelligent transportation system (ITS). The network communications module 159 may send and/or receive data regarding the vehicle 100, other vehicles, traffic conditions, road conditions, and the like. The network communications module 159 may provide an operator with real-time travel and traffic information via the operator I/O device 140, such as transit routes and schedules, navigation directions, and information about delays due to congestion, accidents, weather conditions, road repair work, etc. In some embodiments, the network communications module 159 is able to inform an operator of the vehicle 100 in real-time of his/her precise location, inform him/her of current traffic or road conditions on a current and/or surrounding roadways, and empower him/her with optimal route selection and navigation instructions. Further, the network communications module 159 may receive information/data regarding one or more other vehicles. The communication between the vehicles may be vehicle-to-vehicle or vehicle-to-server-to-vehicle (i.e., vehicle-to-"x" type communication). The vehicle-to-vehicle communication may be performed via any suitable short to medium range wireless communications protocol (e.g., Wi-Fi, infrared, radio, RFID, near-field communications (NFC), Bluetooth, etc.). The vehicle-to-server-to-vehicle (generally, vehicle-to-x) communication may be performed via any suitable long range wireless communications protocol. The data regarding the other vehicle(s) may include, but not limited to, traffic conditions they are currently experiencing or have experienced, road and environment conditions they are experiencing or currently experiencing, a current or past speed of the other vehicle at various locations, a current location of the other vehicle, a type of the other vehicle, and the like. The speed of the other vehicle may include an absolute speed of the other vehicle or a relative speed of the other vehicle in relation to the vehicle 100. The current location of the other vehicle may include an absolute location of the vehicle (e.g., GPS coordinates, etc.) or a relative distance of the other vehicle in relation to the vehicle 100.

Based on at least of the route data 175 and dynamic data 176-177, the power module 157 can determine the engine power output, $P_{eng-out}$. As mentioned above, using the relatively accurate mathematical expression for vehicle losses as a function of vehicle speed (e.g., the low order polynomial), the power module 157 solves, determines, estimates, etc. for the engine power output. Using the route data 175 and/or dynamic data 176-177, the engine power output can be determined at a future location for the vehicle 100. For example, after designation of a route, the route data 175 may indicate that in two miles from the current location the posted speed limit is 65 MPH with a three percent uphill grade. The power module 157 can use the vehicle speed and grade data to determine an engine power output, $P_{eng-out}$, in two miles. However, the route data 175 is largely static in nature. Accordingly, power module 157 may also use the dynamic data 176-177 to account for changing conditions. For example, the dynamic data 176-177 may indicate that in two miles a vehicle crash has occurred and the vehicles in that area are traveling around twenty (20) MPH. In which case, the power module 157 may use 20 MPH and three percent uphill grade to determine the engine power output, $P_{eng-out}$, at that location.

Figure 4:
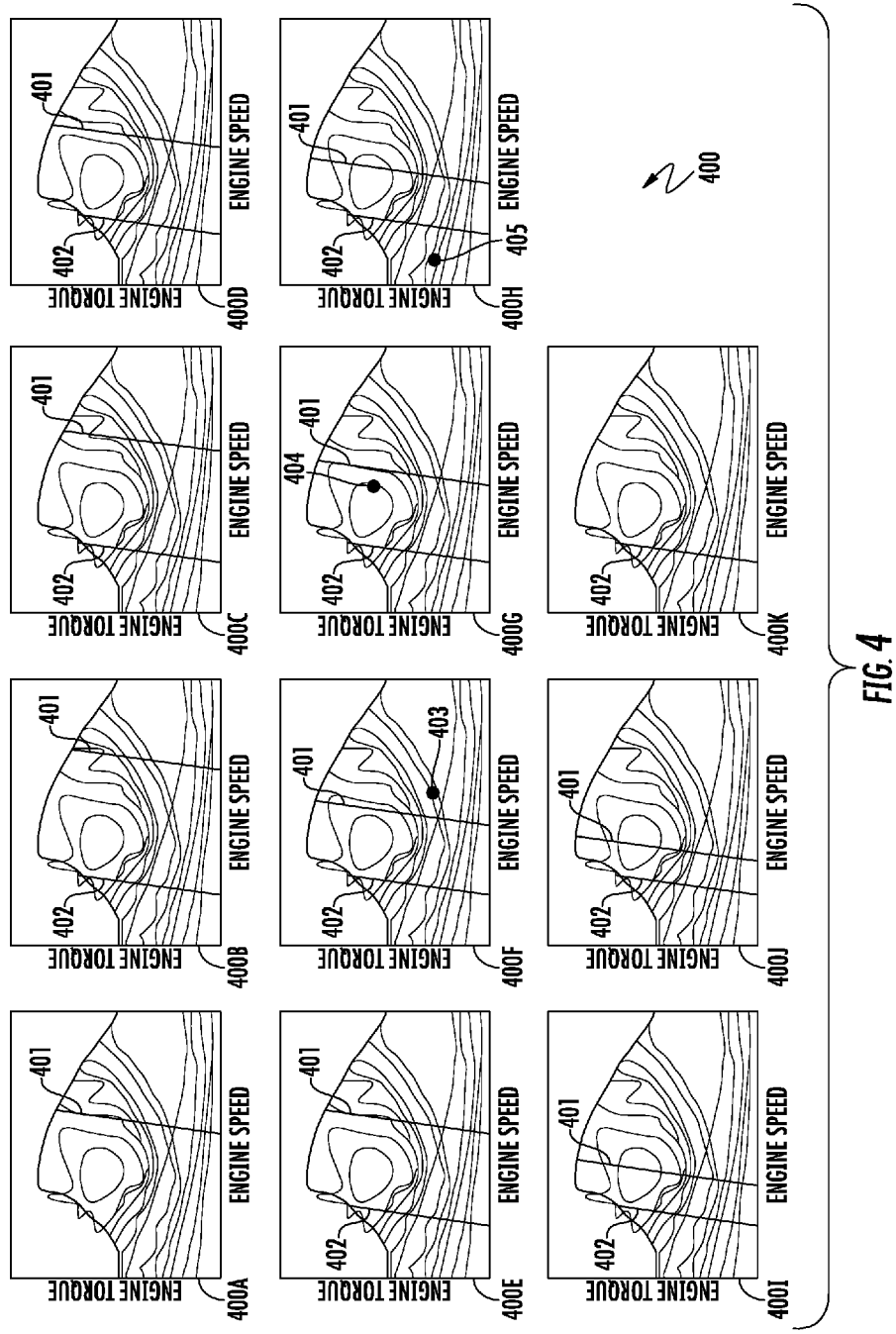
FIG. 4 is a diagram of a shift schedule for a transmission, according to an example embodiment.

Responsive to the determined engine output power, the transmission module 160 is structured to determine one or more potential transmission settings for the vehicle 100. That is to say, for a specific vehicle speed, a transmission for a vehicle can only support that speed in certain settings (e.g., due to wear/tear issues, ratability issues, etc.). Further, for each of those settings, due to gearing (i.e., input to output ratios), only one engine speed is possible. However, that engine speed can correspond with a variety of torque outputs and, therefore, power outputs. But, because the power module has determined the engine output power, for each engine speed solution in each transmission setting, the power module 157 can determine a corresponding engine torque output. Therefore, the transmission module 160 may now know the engine torque and engine speed for each of the applicable transmission settings based on the determined engine power output. The transmission module 160 is structured to selectively adjust an original shift schedule 174 for the transmission based on the determined engine power output and, more particularly, based on the engine torque and engine speed settings for at least one transmission setting. The adjustment 178 may include, but is not limited to, a delay to a scheduled shift event, an early implementation of a scheduled shift event, and a skipping of a scheduled shift event. As mentioned above, in one embodiment, the adjustment 178 is pursuant to a desired operating characteristic of one or more operating parameters 173. A transmission shift schedule is shown in FIG. 4, according to one embodiment. In FIG. 4, the example shift schedule is for an eleven-speed transmission (hence, graphs 400A, 400B, 400C, 400D, 400E, 400F, 400G, 400H, 400I, 400J, and 400K correspond to each of the eleven transmission settings). In each of the graphs, the slanted lines 401 represent the upshift operating conditions (e.g., from second to third gear) while the slanted lines 402 represent the downshift operating conditions (e.g., from second to first gear). Collectively, the graphs 400A-400K represent an example shift schedule for a transmission. Thus, the transmission module 160 can selectively adjust the positioning of the shift points (lines 401 and 402) for one or more transmission settings (e.g., gears) pursuant to a desired operating characteristic of one or more operating parameters 173.

As shown, other than the first and top settings (e.g., first gear and eleventh gear), the determined engine speed and torque can be located within the upshift and downshift lines or outside of the upshift and downshift lines. For example, for a given vehicle speed and engine power output, the transmission module 160 may determine that gears six-eight may meet that criteria. However, as shown in each map, the operating points 403, 404, and 405 in each setting correspond with different engine speeds and torques. Further, the curvy lines in FIG. 4 represent the brake specific fuel consumption (BSFC). Accordingly, each operating point also corresponds with a different BSFC. In this example, if fuel economy is desired, the transmission module 160 may determine that seventh gear is the best setting due to the higher BSFC for operating point 404 as compared to the BSFC for operating points 403 and 405. However, other factors may be used by the transmission module 160 to determine a transmission setting or an adjustment of one of the transmission settings to achieve or substantially achieve one or more operating characteristics for one or more vehicle operating parameters 173.

Figure 5:
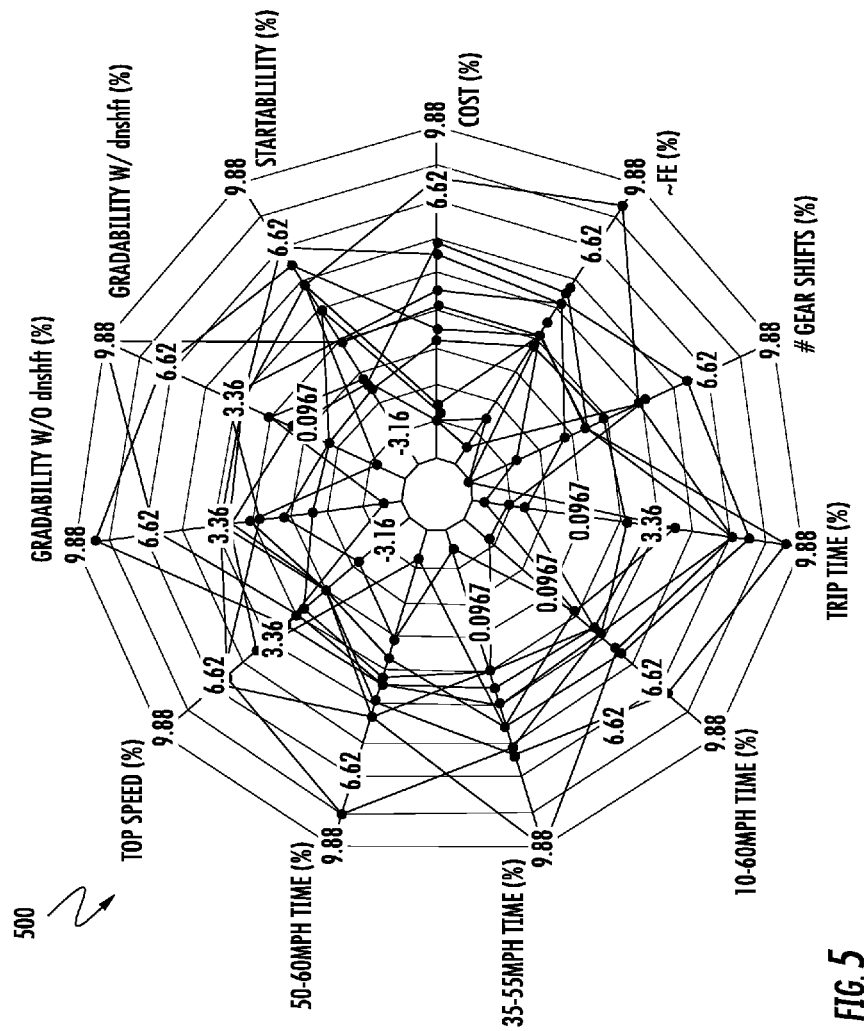
FIG. 5 is a diagram illustrating a cost function with a plurality of vehicle performance metrics, according to an example embodiment.

Referring now to FIG. 5, a diagram 500 (shown as a spider diagram) illustrating a cost function including a plurality of vehicle performance metrics (e.g., vehicle operating parameters 173) is shown, according to one embodiment. Instead of optimizing a single vehicle operating parameter of the vehicle, a plurality of factors may be considered during the process of adjusting the transmission shift schedule. The diagram 500 illustrates the impact of each shift point adjustment being considered. For example, in FIG. 5, the factors may include a gradability characteristic of the vehicle (e.g., a measure of the vehicle's ability to ascend a slope at a certain vehicle speed), with or without downshift. This may be important because when a shift occurs, there is a momentary loss of power which the operator may perceive as a loss of control of the vehicle. The factors may also include a startability characteristic (e.g., the vehicle's ability to start and pull a load). The factors may include a cost, a number of gear shifts, an estimated trip time (based on the route data), and other such information. The factors may include acceleration characteristics of the vehicle. The acceleration characteristics may include a top speed of the vehicle, and the time the vehicle takes to accelerate from one speed to another (e.g., from 50 milesper-hour (mph) to 60, 35-55 mph, 10-60 mph, etc.). It should be understood that this list of vehicle parameters is not meant to be limiting, such that many other and types of parameters may also be included. For example, in the embodiment of FIG. 5, fuel economy and a variety of drivability measures are shown as the vehicle parameters under consideration. Moreover, the example in FIG. 5 is for a line haul truck with an example set of performance factors (e.g., operating parameters). Other embodiments (e.g., for a sedan, etc.) may utilize a different set of performance factors.

In one embodiment, using the various vehicle parameters 173, the transmission module 160 generates a weighted sum score to determine a final cost function (e.g., each vehicle parameter is weighted based on its importance and impact to vehicle performance). The weight sum score (e.g., Parameter 1 (weight percentage)+Parameter 2 (weight percentage) . . . +Parameter N (weight percentage)=100) may be based on user defined weight percentages or weighting aspects that may favor one parameter over another (e.g., reducing the number of gear shifts may be more important than available power, etc.). Further, by defining the appropriate cost function, the function may be optimized to, e.g., a minimum value or maximum value. In this regard, the cost function is optimized based on the determined powers (i.e., the operating parameter may only be optimized to a certain extent in order to overcome the vehicle losses and provide power to support vehicle acceleration—the determined engine output power). The minimum and maximum values may be correlated with or associated to a particular transmission setting to (and/or an adjustment thereto) in order to achieve or substantially achieve a desired operating characteristic for one or more vehicle operating parameters.

Figure 6:
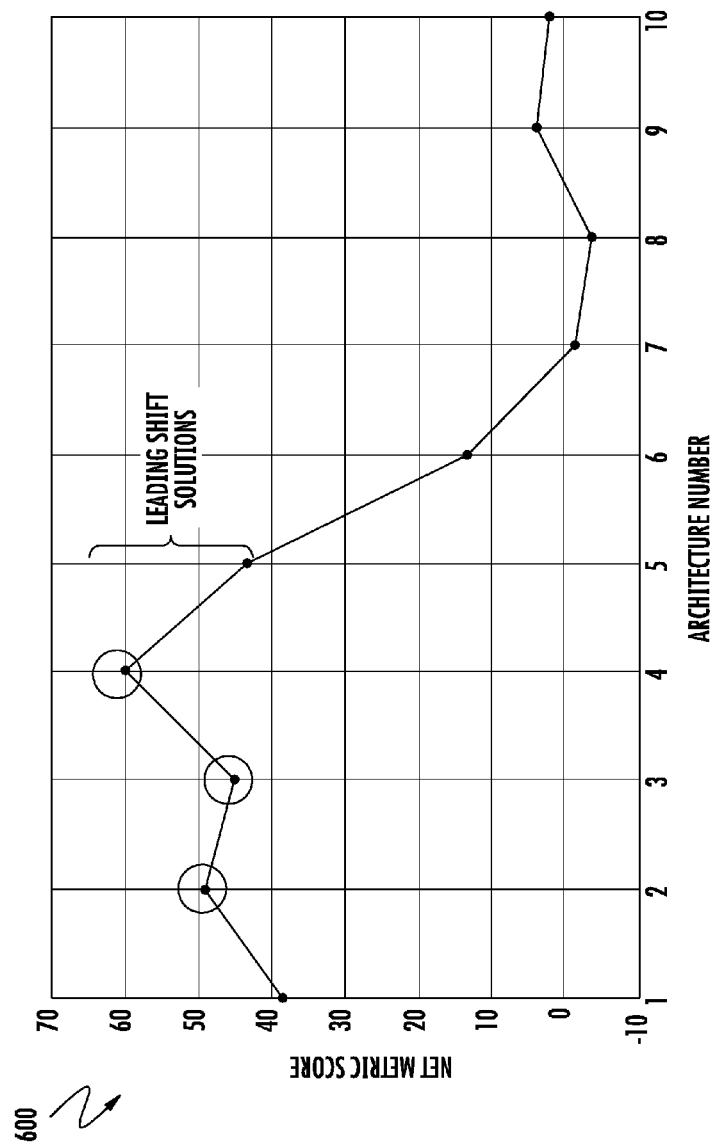
FIG. 6 is a graph illustrating a cost value associated with a shift schedule of a vehicle, according to an example embodiment.

Referring now to FIG. 6, a graph 600 illustrating a cost value associated with a shift schedule of a vehicle is shown. More particularly, for a plurality of transmission settings (illustrated on the x-axis of graph 600), an associated cost with each setting is shown (i.e., the score for that setting). The cost is determined using the cost function illustrated in FIG. 5. In the embodiment of FIG. 6, three transmission settings, shown as 601, 602, and 603, are identified as optimal "solutions" (e.g., transmission settings that optimize the plurality of vehicle operating parameters). The identified transmission settings along with their respective "score" may be used by the transmission module 160 for controlling or indirectly facilitating control thereof of the transmission 102. However, identification of the best transmission setting may only be step one, as the transmission module 160 may further adjust characteristics of that or other transmission settings to adjust the entirety or a part thereof the shift schedule for the transmission. For example, if operating point 404 was just to the right of the upshift line 401, but at the same torque amount, the transmission module 160 may determine that the upshift line 401 should be adjusted to the right. In this regard, an upshift may not be necessary as it would or should occur based on the un-adjusted shift schedule. Thus, the transmission module 160 is structured to not only identify a best transmission setting, but also make refinements to the shift schedule, to provide an enhanced ability of achieving desired operating characteristics for one or more parameters.

It should be understood that while FIGS. 5-6 illustrate a weighted sum score for each potential transmission setting, other embodiments may utilize other and/or different types of cost functions to determine the best transmission setting (i.e., the transmission setting most likely to achieve or substantially achieve a desired operating characteristic of a desired operating parameter). For example, other embodiments may utilize any combination of linear or non-linear, time varying or static, distance varying or static formula, model, look-up table, algorithm, method, process, and the like to adjust the shift schedule for the transmission.

Figure 7:
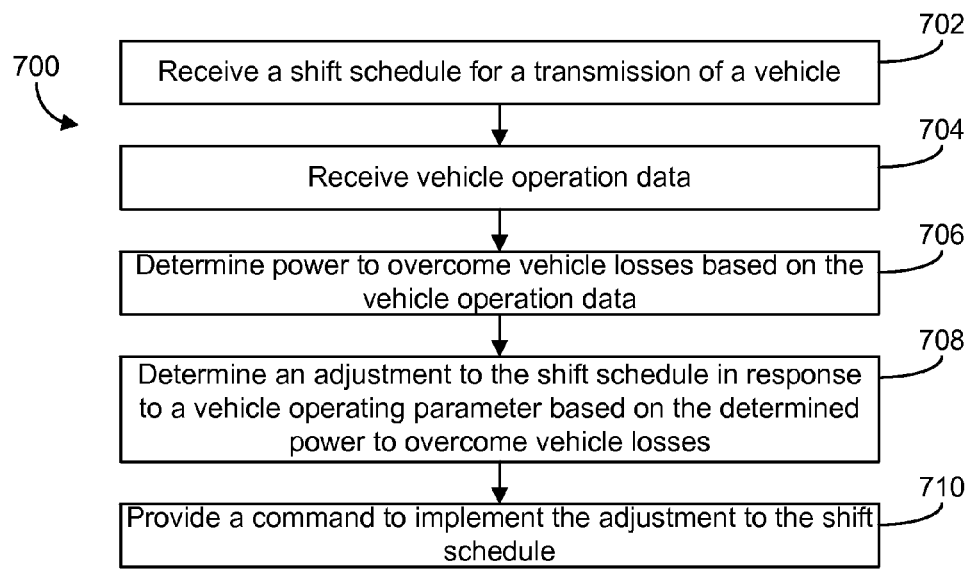
FIG. 7 is a flow diagram of a method for dynamically controlling the transmission in a vehicle, according to an example embodiment.

Referring now to FIG. 7, in relation to FIG. 1, a flow chart of a method 700 of dynamically adjusting a shift schedule for the transmission 102 of the vehicle 100 is shown, according to an exemplary embodiment. Accordingly, the method 700 is described with reference to FIGS. 1-2. The controller 150 receives a shift schedule for a transmission of a vehicle (process 702). As mentioned above, the shift schedule indicates when the transmission undergoes a shift event based on the operating conditions of the vehicle. During operation of the vehicle, the controller 150 receives vehicle operation data, such as vehicle operation data 171 (process 704). The vehicle operation data is obtained from the components and systems shown in FIG. 1. As such, the vehicle operation data includes, but is not limited to, the vehicle speed, the current transmission gear/setting, the current combustion recipe (e.g., conditions required for combustion in the engine 101, determined using Alpha and Chi tables), the throttle position, a set cruise control speed, data relating to the exhaust aftertreatment system 120, output power, etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst). Further, in certain embodiment, the operation data may be acquired via one or more virtual sensors (i.e., using one or more formulas, algorithms, and the like to determine a value rather than a direct measurement). All such variations are intended to fall within the spirit and scope of the present disclosure.

The controller 150 determines the power needed to overcome vehicle losses based on the vehicle operation data (process 706). The power to overcome vehicle losses may include the engine output power, $P_{eng-out}$, as described above. Accordingly, the power to overcome vehicle losses may include one or more of a wheel drag power, an aerodynamic power, a gravitational power, an acceleration power, a power associated with vehicle losses. In this regard, in one embodiment, the controller 150 utilizes Equation (2) to establish an expression that approximates vehicle losses as a function of or responsive to vehicle speed. The controller 150 may then utilize the expression after a sufficient amount of convergence or accuracy has been determined. For example, after a predefined amount of time, distance, and/or a predefined number of data points intersected by the expression, etc. After convergence, the controller 150 may determine the vehicle losses (right hand side of Equation (2)) based on a certain vehicle speed and determine the acceleration and gravity power based on the road grade and vehicle speed. As such, the controller 150 can readily determine the engine output power for a vehicle speed and road grade. The determined power output may be used in connection with the shift schedule (process 202) to identify transmission settings that can substantially achieve the desired vehicle speed (e.g., within five percent of the vehicle speed). Because a transmission comes with a rating that prescribes the vehicle speed for each setting and because some settings may correspond with an overlap in vehicle speeds, the controller 150 can readily identify the potential transmission settings. Then, as described above, with the engine speed for each identified transmission setting known in conjunction with the determined power output, the controller 150 can determine an engine torque for each engine speed for each transmission setting (e.g., $T_{eng\ out} = P_{eng\ out}/\omega_{eng\ out}$). The controller 150 may map each data point (engine speed and torque) on each graph corresponding with each identified transmission setting to determine where the operating point is in relation to the upshift and downshift lines, the BSFC, etc. as shown in FIG. 4.

Responsive to the determined engine power output for the determined vehicle losses (aerodynamic, rolling resistance, powertrain losses) and the determined power to support acceleration and overcome road grade, the controller 150 determines an adjustment to the shift schedule (process 708). More particularly, based on identified operating points for each transmission setting, the controller 150 may then determine an adjustment to the shift schedule responsive to a desired operating characteristic of one or more operating parameters. The adjustment may include an identification of the "best" transmission setting based on the effect that transmission setting has on the one or more operating parameters. The adjustment to the shift schedule may further include, for example, a delay to a scheduled shift event, an early implementation of a scheduled shift event, or a skipping of a scheduled shift event. The adjustment to the shift schedule may also include an adjustment to a shift point for one or more transmission settings (e.g., a transmission shift at X pounds of load and Y power to support vehicle acceleration from $3^{rd}$ to $4^{th}$ gear occurs at 1,100 RPM—the shift point adjustment—as opposed to the scheduled RPM of 2,100) (i.e., an adjustment of one or more upshift and downshift lines for one or more transmission settings).

As briefly mentioned above, the adjustment to the shift schedule may be used to optimize a vehicle operating parameter. In various embodiments, the vehicle operating parameters may include, but are not limited to, a fluid consumption rate (e.g., fuel, coolant, oil, etc.), an exhaust emissions characteristic, a noise level of the vehicle, an acceleration characteristic, a number of transmission setting shifts, and a gradability characteristic. Accordingly, a desired operating characteristic of the vehicle operating parameters may include a minimization of fuel consumption, a reduction of engine noise, a minimization of NOx emissions, and the like. In this regard, the controller 150 may use one or more optimization functions, such as the diagrams shown in FIGS. 5-6 for a particular set of performance criteria (e.g., fuel economy, number of shift events, etc.). The controller 150 provides a command to implement the adjustment to the shift schedule (process 710). In one embodiment, the command is provided to the transmission 102. In another embodiment, the command is provided to the operator input/output device 140 for an operator to implement the adjustment with the transmission 102. These embodiments illustrate the difference between an automatic and a manual transmission. For example, in an automatic transmission, the controller automatically adjusts the shift schedule with little to no operator input. In a manually controlled transmission, the shift schedule adjustment is provided to an operator input/output device, such as input/output device 140, for the operator to directly implement the shift schedule adjustment.

Figure 8:
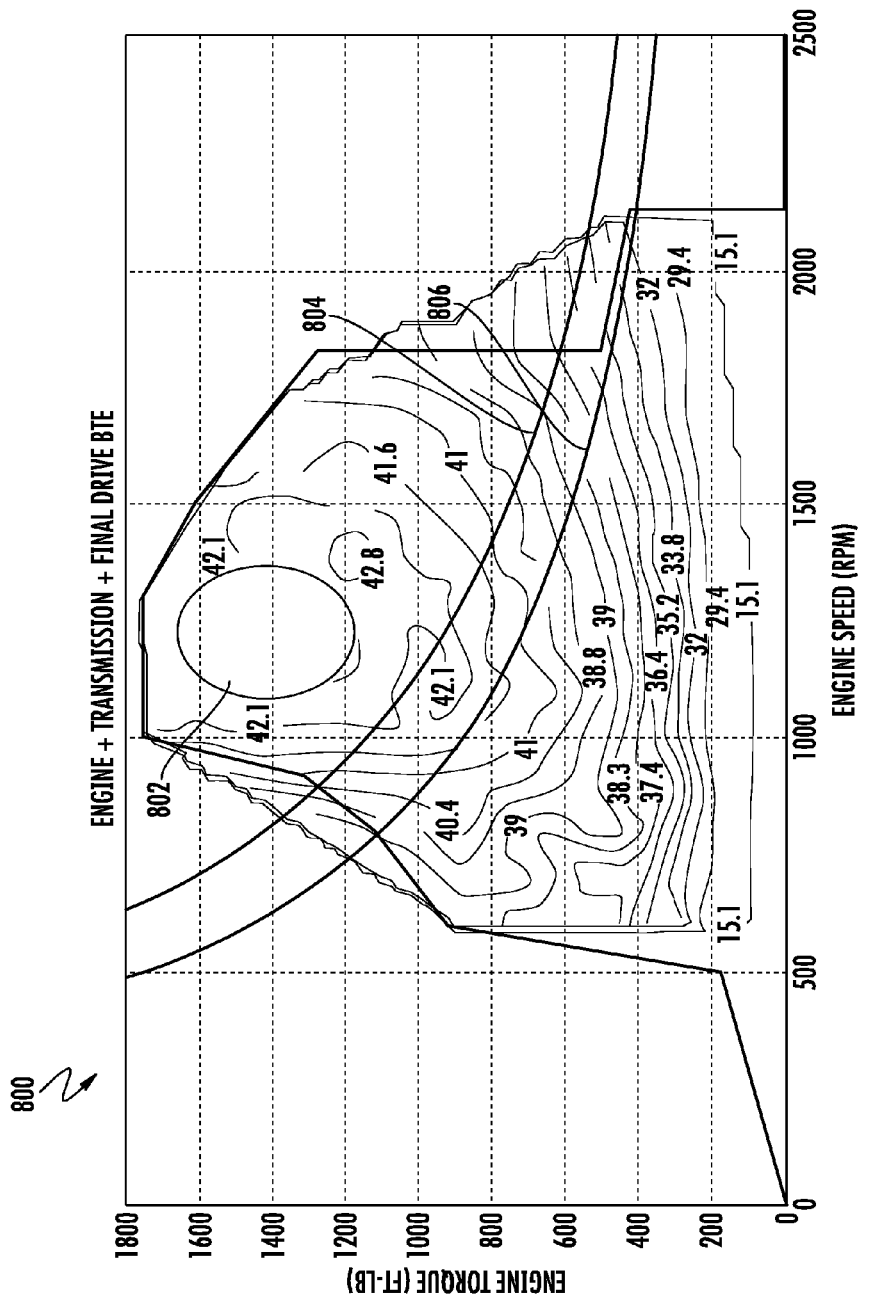
FIG. 8 is a graph of engine speed and engine load for two vehicles, according to an example embodiment.

By accounting for the total amount of vehicle losses, the controller 150 accounts for differences in vehicles that use the same driveline. For example, an unloaded truck versus a loaded truck will have vastly different gravitational power requirements. Similarly, a truck with fins, spoilers, and other aerodynamic devices may have a much lower aerodynamic power than a truck without any aerodynamic devices. An example is shown in FIG. 8, which illustrates a map engine speed (RPM) and engine load (engine torque (ft-lb)) according to one embodiment. Curve 804 represents a cruise power curve for vehicle A and curve 806 represents a cruise power curve for Vehicle B. In this example, cruising power is approximately 65 MPH and each of Vehicles A and B have the same driveline. However, Vehicle B is a newer model relative to Vehicle A that uses lighter weight components; but, the driveline remains the same. Region 802 represents the most efficient BSFC region for the Vehicles A and B. As can be seen, the power curves 804 and 806 do not align, such that an operator will have different experiences with Vehicle A versus Vehicle B, despite the same driveline used in each vehicle. Accordingly, the controller—at processes 708-710—may provide and implement one or more adjustments with the transmission shift schedule for, e.g., Vehicle B to achieve similar operating effects as Vehicle A to reduce variations between vehicles.

Figure 9A:
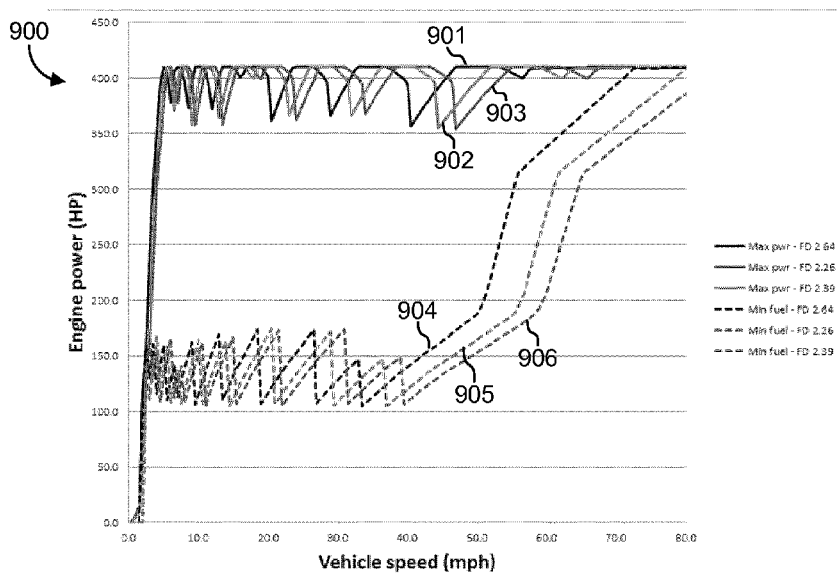
FIGS. 9A-9B are graphs illustrating a comparison between shift schedules for a vehicle, according to an example embodiment.
Figure 9B:
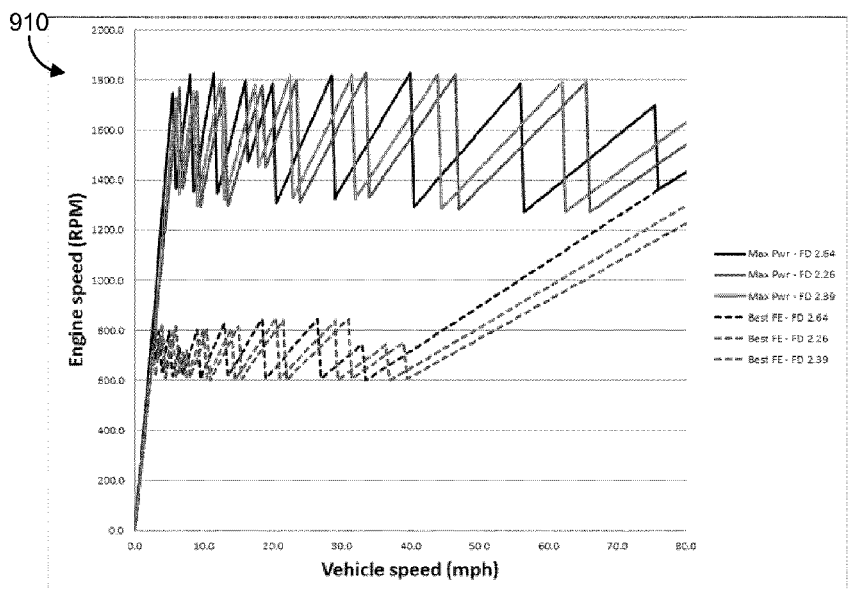

An example showing the effect of the transmission shift schedule regarding fuel economy and engine power is illustrated in FIGS. 9A-9B. More particularly, graphs 900 and 910 illustrate a comparison between a shift schedules. The solid lines, 901-903, represent a maximum engine power shift schedule and the dashed lines, 904-906, represent a best fuel economy shift schedule. Line 901 represents a maximum engine power as a function of vehicle speed with a final drive ratio (e.g., ratio of transmission output to rotational speed to final drive (wheel) rotational speed) of 2.64. Line 902 represents a maximum engine power as a function of vehicle speed with a final drive ratio of 2.26. Line 903 represents a maximum engine power as a function of vehicle speed with a final drive ratio of 2.39. Line 904 represents a best fuel economy as a function of vehicle speed for a final drive ratio of 2.64. Line 905 represents a best fuel economy as a function of vehicle speed for a final drive ratio of 2.26. Line 906 represents a best fuel economy as a function of vehicle speed for a final drive ratio of 2.39. Between the two extreme shift schedules illustrated in FIGS. 9A-9B, the shift schedule of the transmission may be adjusted by the controller 150. As shown, depending on the parameter of interest (fuel economy or power), there is a fairly large continuum for which the shift schedule may be adjusted. In this regard, to the define the shift point, the controller 150 references the engine load (engine power output) for the road grade and the vehicle acceleration by factoring the baseline vehicle/powertrain losses that were used to define the original shift schedule, accounting for the additional (or lower) vehicle/powertrain losses that are being experienced by the current vehicle, and correcting the shift schedule for these differences.

Figure 10:
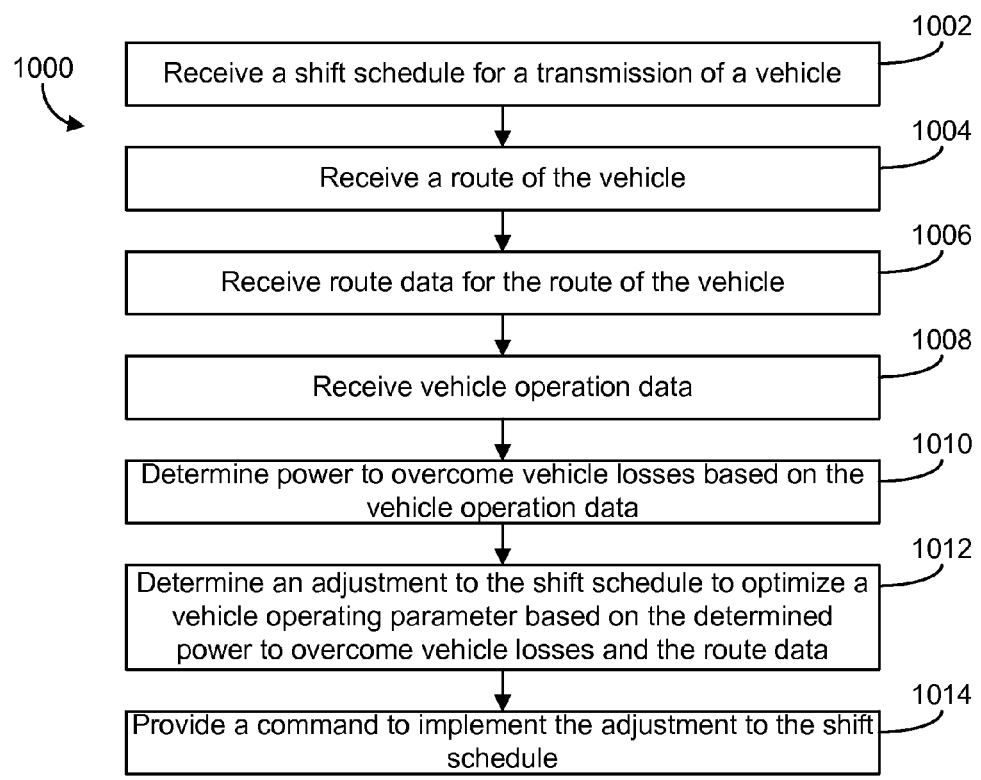
FIG. 10 is a flow diagram of a method for controlling the transmission in a vehicle based in part on route data, according to an example embodiment.

Referring now to FIG. 10, a flow chart of a method 1000 of dynamically controlling a transmission of a vehicle based on route data is shown, according to an exemplary embodiment. Accordingly, the method 1000 is described with reference to FIGS. 1-2. As shown, the method 1000 contains substantially similar steps as the method 700.

The controller 150 receives a shift schedule for a transmission of a vehicle (process 1002). The controller 150 further receives a route of the vehicle (process 1004). The route may generally include a start point and end point for the vehicle. The route may be received via the operator input/output device 140. After designation of the route, the controller 150 receives route data for the route, such as route data 175 (process 1006). The route data may include, but is not limited to, latitude data, longitude data, altitude data, and curvature data for the route. In some embodiments, the controller 150 may divide the route into one or more route segments. The route segments may correspond with substantially continuous portions of route data (e.g., the altitude for one portion of the route may stay substantially the same). Accordingly, the route data may correspond with each one of the segments of the route. Latitude and longitude data provides an indication of the location of the vehicle. Altitude data provides an indication of the level of elevation of the route to, for example, indicate downhill and uphill portions of the route. Curvature data provides an indication of the curves in the route.

In some embodiments, the route data is obtained from the past operation of the vehicle over the selected route. The history of transmission settings for each portion of the route (and their effect on certain vehicle operating parameters) can be recalled by the controller 150 (in one or more memory devices) to analyze the effects the settings had on various vehicle operating parameters. If certain parameters operated outside of a selected range, then the controller 150 may command a shift event adjustment for those portions of the route. Accordingly, the route data represents forward horizon data for the vehicle (e.g., data conditions that are likely to be experienced by the vehicle at specific future locations in the route).

The controller 150 also receives vehicle operation data (process 1008) and determines the power needed to overcome vehicle losses based on the vehicle operation data (process 1010). The controller 150 determines an adjustment to the shift schedule (process 1012). As compared to the method 700, the adjustment is based on the route data in addition to the determined power to overcome vehicle losses. If scheduled shift events are determined to be likely to cause a vehicle operating parameter to operate outside of a desired range for a route segment, the controller 150 may determine an adjustment to the transmission setting in accordance with the desired operation of the selected vehicle operating parameter. In other words, the controller 150 determines an optimal transmission setting for each route segment of the route. The controller 150 may utilize one or more algorithms, predictive algorithms, formulas, look-up tables, and the like to determine a predicted impact on the vehicle operating parameter. For example, the route data may indicate that two portions of the route have uphill portions (e.g., above a predefined grade) and fuel economy is selected as the vehicle operating parameter. Using Alpha and Chi tables, the controller 150 may determine an optimum transmission setting (e.g., gear) for each specific uphill portion in order to maximize fuel economy. The optimum gear may differ from the scheduled gear. The controller provides a command to implement the adjustment to the shift schedule (process 1014). As in method 700, the command may be provided directly to the transmission or to an operator input/output device.

Because the vehicle operation data may not always include each piece of data needed for the calculation, these powers may be estimated based on the acquired vehicle operation data and one or more look up tables and/or other formulas. It should be noted that many other equations, including look-up tables and models, may also be utilized to determine the power to support vehicle acceleration and the power to overcome the vehicle losses experienced by the vehicle. Using these determinations (in some cases, estimates), the controller determines one or more shift event adjustments to a transmission shift schedule. In some embodiments, a vehicle operation parameter is optimized within the constraints of these determinations. In regard to method 1000, route data may also be utilized in order to take into event upcoming events (e.g., an uphill portion of a route).

An example of how the controller accounts for different vehicles with the same transmission may be as follows. To get the same vehicle drivability from a first vehicle to a second vehicle, wherein the second vehicle has greater aerodynamic, rolling, and driveline losses, the shift schedule needs to be delayed. To get the same fuel economy from a first vehicle to a second vehicle, wherein the second vehicle has greater aerodynamic, rolling, and driveline losses, the shift schedule needs to be advanced.

Another example, and in regard to method 1000, is that the controller 150 may receive a posted speed limit and grade data in advance of the vehicle travelling a particular region of a route. Using the expression (e.g., Equation (2)), the controller 150 may identify one or more transmission settings for that region based on the vehicle speed, determine the engine power output based on the vehicle speed and the grade data, and identify the particular operating points for each identified transmission setting during that route segment. The controller 150 may then apply one or more optimization functions for each transmission setting (and operating point thereof) in order to adjust the shift schedule in response to a parameter.

It should be noted that the processes of the methods described herein may be utilized with the other methods, although described in regard to a particular method. It should further be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., coupled to the components and/or systems in FIG. 1) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method, comprising:
   receiving a shift schedule for a transmission of a vehicle, the shift schedule indicating when shift events occur based on operation of the vehicle;
   receiving vehicle operation data regarding operation of the vehicle;
   determining a power to overcome vehicle losses based on the vehicle operation data;
   determining an adjustment to the shift schedule responsive to the determined power to overcome losses and a vehicle operating parameter; and
   implementing the adjustment with the shift schedule of the transmission, wherein the adjustment includes one of a delay to a scheduled shift event, an early implementation of the scheduled shift event, or a skipping of the scheduled shift event.

2. The method of claim 1, wherein the vehicle losses include an aerodynamic power loss, a powertrain loss, a rolling resistance power loss, a road grade load, and a vehicle acceleration load.

3. The method of claim 1, wherein the power to overcome vehicle losses is determined based on an expression for vehicle losses using a vehicle speed.

4. The method of claim 3, wherein the expression is a low-order polynomial expression that has a predefined amount of convergence.

5. The method of claim 4, wherein the predefined amount of convergence is at least one of time based and distance based.

6. The method of claim 1, further comprising identifying at least one transmission setting corresponding with a vehicle speed, and identifying an engine torque and an engine speed for each of the at least one transmission setting based on the determined power to overcome vehicle losses.

7. The method of claim 1, wherein the vehicle operating parameter includes at least one of a fluid consumption rate, an exhaust emissions characteristics, a noise level of the vehicle, an acceleration characteristic, a number of transmission setting shifts, and a gradability characteristic.

8. The method of claim 1, further comprising determining a cost function for the vehicle operating parameter, determining at least one of a minimum and a maximum value for the cost function, and associating the at least one of the minimum and the maximum value with a transmission setting for the transmission.

9. A system, comprising:
   a powertrain system including an engine and a transmission; and
   a controller communicably coupled to the power train system, the controller structured to:
   receive a shift schedule for the transmission of a vehicle, the shift schedule indicating when shift events occur based on operation of the vehicle;
   receive vehicle operation data regarding operation of the vehicle;
   determine a power to overcome vehicle losses based on the vehicle operation data;
   determine an adjustment to the shift schedule responsive to the determined power to overcome losses and a vehicle operating parameter; and
   implement the adjustment with the shift schedule, wherein the adjustment includes one of a delay to a scheduled shift event, an early implementation of the scheduled shift event, or a skipping of the scheduled shift event.

10. The system of claim 9, wherein the implementation of the adjustment is one of providing a prompt to an input/output device of the vehicle for an operator to implement the adjustment or automatically implementing the adjustment with the transmission without operator input.

11. The system of claim 9, wherein the power to overcome vehicle losses is determined based on an expression for vehicle losses using vehicle speed.

12. The system of claim 11, wherein the expression is a low-order polynomial expression that has a predefined amount of convergence, wherein the predefined amount of convergence is at least one of time based and distance based.

13. The system of claim 9, wherein the controller is further structured to receive route data indicative of a condition of a route of the vehicle in advance of the vehicle traveling the route, determine a power to overcome vehicle losses based on the route data, and determine an adjustment to the shift schedule in response to the determined power to overcome vehicle losses for a segment of the route.

14. An apparatus, comprising:
   a vehicle operation module structured to receive operation data regarding operation of a vehicle;
   a power module structured to determine a power to overcome vehicle losses in response to the vehicle operation data and based on an expression for vehicle losses using vehicle speed; and
   a transmission module structured to adjust a shift schedule of a transmission of the vehicle responsive to the determined power to overcome vehicle losses and a vehicle operating parameter, wherein the adjustment includes one of a delay to a scheduled shift event, an early implementation of the scheduled shift event, or a skipping of the scheduled shift event.

15. The apparatus of claim 14, wherein the expression is a low-order polynomial expression that has a predefined amount of convergence, wherein the predefined amount of convergence is at least one of time based and distance based.

16. The apparatus of claim 14, wherein the transmission module is structured to identify at least one transmission setting corresponding with the vehicle speed, and identify an engine torque and an engine speed for each of the at least one transmission settings based on the determined power to overcome vehicle losses.

17. The apparatus of claim 16, wherein the transmission module is structured to identify a brake specific fuel consumption for the identified engine speed and engine torque for each at least one transmission setting, and wherein the transmission module is structured to determine a transmission setting corresponding to a lowest brake specific fuel consumption and facilitate implementation of the transmission setting corresponding to the lowest brake specific fuel consumption with the vehicle.

18. The apparatus of claim 14, further comprising a route module structured to receive route data for a designated route of the vehicle, and wherein the power module is structured to determine a power to overcome vehicle losses for at least one segment of the route based on the route data.

19. The apparatus of claim 14, further comprising a network communications module structured to receive dynamic data indicative of one or more upcoming operating conditions for the vehicle from at least one of another vehicle and an external network, wherein the power module is structured to determine a power to overcome vehicle losses based on the dynamic data, and wherein the transmission module is structured to adjust the shift schedule in response to the determined power to overcome vehicle losses based on the dynamic data.

20. The apparatus of claim 14, wherein the vehicle operating parameter includes at least one of a fluid consumption rate, an exhaust emissions characteristics, a noise level of the vehicle, an acceleration characteristic, a number of transmission setting shifts, and a gradability characteristic.

* * * * *